Figure 1:
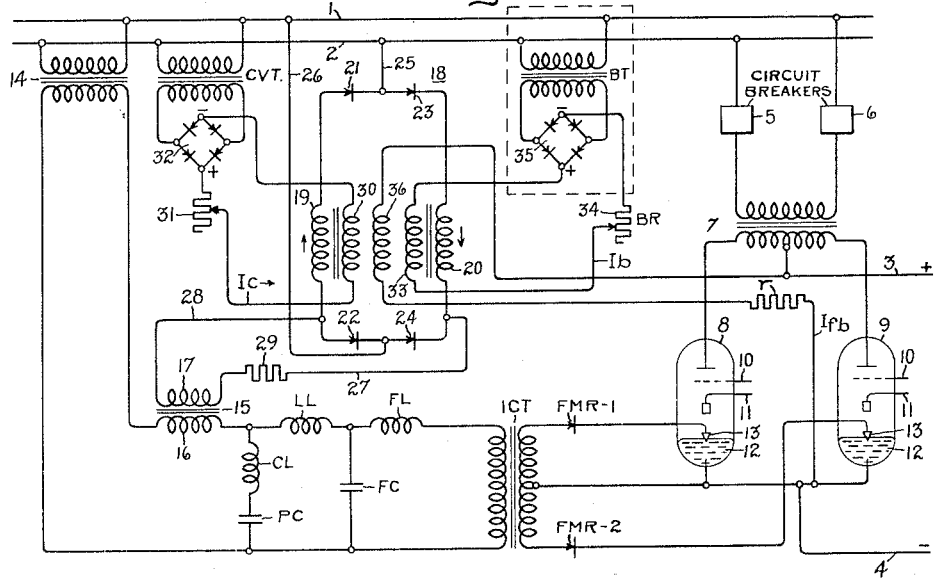

June 10, 1952 A. H. MITTAG ET AL 2,600,315
VOLTAGE CONTROL SYSTEM
Filed July 22, 1950

Inventors:
Albert H. Mittag,
Marvin J. Mulhern,
by Ernest C. Britton
Their Attorney.

Patented June 10, 1952

2,600,315

UNITED STATES PATENT OFFICE 2,600,315

VOLTAGE CONTROL SYSTEM

Albert H. Mittag and Marvin J. Mulhern, Schenectady, N. Y., assignors to General Electric Company, a corporation of New York Application July 22, 1950, Serial No. 175,450

9 Claims. (Cl. 321—18)

This invention relates to voltage control systems and more particularly to an arrangement for maintaining the output voltage of an electronic translating system substantially constant even though the supply voltage varies over a relatively wide range.

Where direct current motors are energized from electronic rectifying apparatus such as ignitron tubes, for example, it is desirable to avoid fluctuations in the voltage supplied by the electronic translating apparatus even though the voltage or frequency of the alternating current circuits associated with the electronic equipment is subject to substantial variations.

Electronic valves of the ignitron type having an anode, a control grid, a holding anode and a mercury pool cathode enclosed in an envelope utilize an ignitor element immersed in the mercury pool to establish a cathode spot within the valve when a current is supplied through the ignitor element. It is well known that the output of such valves can be controlled by either controlling the energization of the control grid or by controlling the phase angle of the energization of the ignitor firing circuit relative to the cathode-anode voltage of the valve.

In known rectifying equipment utilizing ignitrons it has been the practice to control the phase angle of the ignitor circuit by suitable phase control means energized from an alternating current source. Because such phase shifting control means as well as the ignitor firing circuit itself are inherently sensitive to fluctuations in the alternating current supply voltage and hence tend to produce unreliable operating characteristics of the valves, it has been the practice to use a relatively expensive constant voltage transformer for maintaining a substantially constant voltage supply to the phase control means even though the voltage of the alternating current source might vary considerably.

A principal object of the invention is to provide an improved voltage regulating system for electronic translating apparatus.

Another object of the invention is to provide an improved control arrangement for electronic translating equipment wherein variations in the supply voltage are utilized to aid in controlling the output voltage.

Still another object of the invention is to provide an improved control arrangement for electronic translating equipment wherein variations in the supply frequency are utilized to aid in controlling the output voltage.

A further object of the invention is the provision of an improved phase control system for controlling a control element of an electronic valve without the necessity for using a relatively expensive constant voltage transformer.

According to the invention the phase angle of an ignitor firing circuit for an ignitron tube is controlled by an amplistat or magnetic amplifier circuit having main windings and a biasing winding energized directly from a source of alternating current voltage which voltage is subject to variations. A feedback winding for the amplistat is responsive to the output voltage of the system and control of the circuit is obtained by means fo a control winding for the amplistat arranged to be energized by an adjustable but relatively stable current source. Thus, when a desired adjustment of the output voltage is established through the agency of the control winding such voltage is maintained substantially constant through the action of the feedback, biasing and control windings which together produce a magnetizing action sufficient to render the amplistat effective in automatically controlling the phase of the ignitor circuit and thereby to maintain the output voltage of the valve subsequently constant even though the supply voltage may change.

Figure 2:
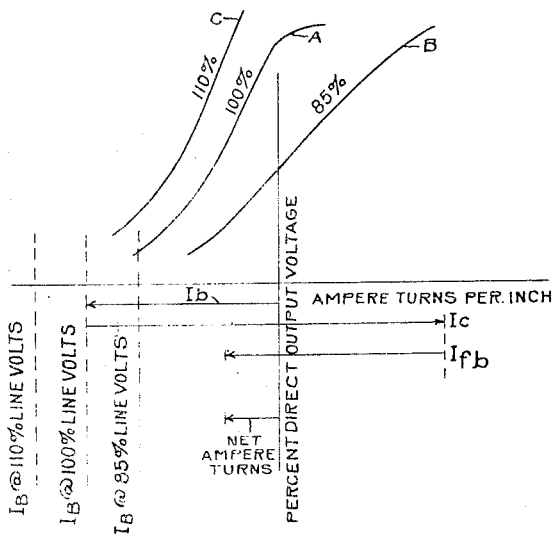
Figure 3:
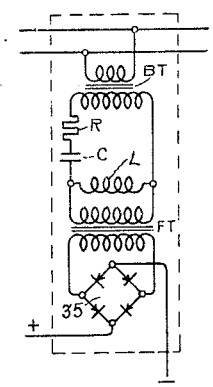

For a better understanding of the invention reference may be had to the accompanying drawings in which Fig. 1 is a schematic representation of translating apparatus of the electronic type in which my invention is embodied; Fig. 2 is a family of curves to aid in understanding some of the principles of the invention; and Fig. 3 is a schematic representation of a modification of Fig. 1.

While the arrangement shown in Fig. 1 and to be described hereinafter is a rectifying system, it will be understood that the invention is also applicable to an inverter system as will be explained.

With reference to Fig. 1 the alternating current circuit comprising conductors 1 and 2 supplied energy to be rectified and fed to the direct current circuit comprising conductors 3 and 4. Energy from the alternating current circuit is supplied through circuit breakers 5 and 6 and transformer 7 to ignitron tubes 8 and 9. Each of the tubes 8 and 9 is provided with a control grid 10, a holding anode 11, a cathode 12 comprising a mercury pool, and an ignitor element 13. Valves 8 and 9 are arranged to conduct alternate half-cycles of alternating current energy supplied from the alternating current circuit.

Ignitors 13 are energized through the firing circuit comprising transformer 14 energized from the alternating current source which in turn energizes the ignitor coupling transformer ICT which in turn supplies current through unidirectional conducting device FMR-1 to the ignitor of tube 8 and through unidirectional conducting device FMR-2 to the ignitor of tube 9. As is well known a charge supplied through linear reactor LL accumulates on firing capacitor FC and subsequently is discharged through firing reactor FL into the primary winding of transformer ICT. Phase shift is accomplished in part by the action of phase shifting reactor CL and phase shifting capacitor PC in a manner well known in the art. Controllable phase shifting is accomplished by phase shifting device 15 having a main winding 16 and a control winding 17. As is well known variations in the flow of current through winding 17 will effect a shift in phase in the current supplied to ignitor elements 13.

For controlling the flow of current through winding 17 the amplistat or magnetic amplifier generally designated by the numeral 18 is used. Amplistat 18 comprises a main winding 19 and another main winding 20. Ordinarily the windings 19 and 20 would be respectively wound on thin individual magnetic cores which for convenience could be provided with a common supporting means. Unidirectional conducting devices 21 and 22 are associated with main winding 19 while unidirectional conducting devices 23 and 24 are associated with main winding 20. Devices 21—24 preferably should be selenium type rectifiers. Energy is supplied to the amplistat from the alternating current circuit through conductors 25 and 26 and output from the amplistat is supplied to winding 17 through conductors 27 and 28 and resistor 29. Thus when conductor 2 for example is positive, current will flow through conductor 25 downwardly in main winding 20 through conductor 27, winding 17, device 22 and conductor 26 to conductor 1. When conductor 1 is positive current flows through conductor 26, device 24, conductor 27, resistor 29 winding 17 upwardly through winding 19, device 21, and conductor 25 to conductor 2.

As is well known the magnetic condition or degree of saturation of the iron of amplistat 18 determines the impedance of the amplistat and hence determines the magnitude of current flow through control winding 17.

For the purpose of controlling the degree of magnetization of the amplistat 18 at least to some extent, a winding such as 30 is used. Winding 30 is a control winding magnetically coupled with both the main windings 19 and 20 and energized through adjustable device 31, rectifiers 32, and constant voltage transformer CVT from the source of alternating current. Since the transformer CVT supplies constant voltage irrespective of whether the voltage of the alternating current supply varies, the value of the current $I_c$ which flows through winding 30 is determined by the adjustment of the device 31, Hence device 31 and control winding 30 comprises a means for establishing an operating range for the device. In Fig. 2 the magnetizing effect of the current $I_c$ is represented by the horizontal vector labeled $I_c$. Ordinarily the direction of flow of the current $I_c$ would be such that the magnetizing effect of this current would aid the magnetizing effect of the current flowing through main windings 19 and 20 of the amplistat 18.

For the purpose of rendering the amplistat 18 responsive to changes in voltage of the alternating current circuit a biasing winding 33 is used. Winding 33 is magnetically coupled with main windings 19 and 20 and is energized through adjustable device 34, rectifiers 35 and transformer BT which in turn is energized from the alternating current source. Thus changes in the voltage of the alternating current source will result in changes in the current flowing to the winding 33 since transformer BT is not a constant voltage device as in known arrangements.

Ordinarily the winding 33 would be arranged so that the flow of the current $I_b$ therethrough would exert a biasing action which would be opposed to the biasing action of the current flowing through control winding 30 and the main windings 19 and 20. In Fig. 2 the magnetizing effect of this biasing current is represented by the vector $I_b$.

In order that the amplistat 19 will be responsive to voltage changes in the direct current output circuit comprising the conductors 3 and 4, a feedback winding 36 of amplistat 18 is connected in series with a suitable resistor $r$ so as to be energized by the voltage appearing across the direct current output circuit. Feedback winding 36, like control winding 30 and biasing winding 34, is magnetically coupled with main windings 19 and 20. Normally, the magnetizing effect of the feedback current $I_{fb}$ in the winding 36 would be such as to aid the magnetizing effect of the biasing winding 33 and to oppose the magnetizing effect of the control winding 30. In Fig. 2 the magnetomotive force due to the current $I_{fb}$ is represented by the vector labeled $I_{fb}$. Thus the feedback winding 33 and the biasing winding 36 tend to demagnetize the iron of the amplistat 18 when a voltage in excess of the desired value occurs on the alternating and direct current circuits.

In Fig. 2 the per cent output voltage of the rectifier circuit is plotted against the net ampere turns resulting from the magnetizing effect of the currents $I_b$, $I_c$, and $I_{fb}$. This value of net ampere turns is the value for a normal or 100% value of voltage of the alternating current circuit comprising conductors 1 and 2. Curve A of Fig. 2 is representative of the voltage conditions for normal operation. Curve B is representative of some value of voltage of the alternating current circuit less than the normal value such as 85% while curve C is representative of a voltage condition of the alternating current circuit in excess of the normal voltage value such as 110%. In Fig. 2 the vertical dotted lines indicate the magnitude of the bias due to the current $I_b$ for three values of the alternating current voltage.

The three curves of Fig. 2 represent three voltage conditions in the alternating current circuit. Voltage changes in the alternating current circuit effect changes in the characteristics of the firing circuit, in the characteristic of the amplistat, and in the characteristics of the phase shifting circuit comprising device 15, reactor CL, and capacitor PC. Thus, a reduction in the alternating current voltage from its normal 100% value to its 85% value for example, effects changes in the characteristic shown in Fig. 2 to the extent of changing the characteristic from that represented by curve A to that represented by curve B. Such a reduced voltage would result in a reduction in the magnitude of the bias current $I_b$. Since a reduction in the alternating current voltage would also result in some reduction at least momentarily in the direct current voltage, the value of the feedback current $I_{fb}$ will also be reduced. Since the value of the control current $I_c$ remains unchanged the net ampere turns will be reduced. Such a reduction in the magnetomotive force applied to the amplistat due to a reduction of the biasing and feedback currents will tend to decrease its impedance and in turn to increase the magnitude of the current flowing through the winding 17 since the control current is unchanged. An increased current through the winding 17 will have the effect of advancing the firing point of the ignitors 13 so as to increase the voltage of the direct current output circuit comprising conductors 3 and 4. Thus by the invention it will be seen that a large relatively expensive constant voltage transformer is not needed for the purpose of energizing the main windings 19 and 20 of the amplistat 18 nor is such a transformer needed for the purpose of energizing a biasing winding such as 33. By the invention it is possible to energize the main windings of the amplistat 18 directly from the alternating current circuit. Furthermore the relatively inexpensive biasing transformer BT can be used and the variations in voltage produced thereby can be effectively utilized to aid in proper voltage control.

It will be understood that the arrangement comprising the invention is also applicable to an arrangement such as that shown in Fig. 1 when operated as an inverter.

The arrangement already described can be made frequency responsive by merely substituting the circuit shown in Fig. 3 for that portion of Fig. 1 enclosed by dotted lines. With reference to Fig. 3, a resistor R, a capacitor C and a reactor L are connected across the transformer BT. Rectifier 35 is energized from the frequency responsive circuit comprising R, L, and C through a transformer FT. Suitable constants would be chosen for R, L, and C to accomplish the desired control of amplistat 18. For certain applications it might be possible to dispense with transformer FT and to energize rectifiers 35 directly from a portion of the frequency responsive circuit comprising RL and C. Of course it might be desirable to use voltage responsive as well as frequency responsive means in a particular application of the invention.

It will be apparent to those skilled in the art that the invention is not limited to the particular arrangement shown and described but that changes and modifications may be made without departing from the spirit and scope of the invention and it is intended that the appended claims will cover all such changes and modifications.

What we claim as new and desire to secure by Letters Patent of the United States is:

1. In combination, an alternating current circuit, a direct current circuit, electric valve means having an anode, a cathode, and a control member interposed between said circuits, control means for energizing said control member so as to render said valve means conductive periodically, phase shifting means including a direct current control winding for varying the phase angle of the energization of said control member relative to the voltage of said anode and said cathode, amplistat means having main windings energized from a source of alternating current voltage and arranged in series with unidirectional conducting devices to supply direct current to said direct current control winding of said phase shifting means, a control winding for said amplistat, adjustable means for energizing said control winding with predetermined polarity, a biasing winding for said amplistat, means for energizing said biasing winding from one of said circuits so that the biasing effect thereof is dependent upon the voltage of said circuit, and a feedback winding on said amplistat energized in accordance with the voltage of the other of said circuits.

2. In combination, an alternating current circuit, a direct current circuit, electric valve means having an anode, a cathode, and a control member interposed between said circuits, a control circuit for energizing said control member so as to render said valve means conductive periodically, phase shifting means including a direct current control winding for varying the phase angle of the energization of said control circuit relative to the voltage of said anode and cathode, amplistat means having main windings energized from a source of alternating current voltage and arranged in series with unidirectional conducting devices to supply direct current to said direct current control winding of said phase shifting means, a control winding for said amplistat, adjustable means for energizing said control winding with predetermined polarity, a biasing winding for said amplistat, means for energizing said biasing winding from said alternating current circuit so that the biasing effect thereof is dependent upon a predetermined electrical quantity of said alternating current circuit, and a feedback winding on said amplistat energized in accordance with the voltage of said direct current circuit, the magnetizing action of said biasing winding and said feedback winding being in opposition to the biasing action of said control winding.

3. In combination, an alternating current supply circuit, a direct current load circuit, electric valve means having an anode, a cathode, and a control member interposed between said circuits, a control circuit for energizing said control member so as to render said valve means conductive periodically, phase shifting means including direct current control winding for varying the phase angle of the energization of said control member relative to the voltage of said anode and cathode, amplistat means having main windings energized from a source of alternating current voltage and arranged in series with unidirectional conducting devices to supply direct current to said direct-current control winding of said phase shifting means, a control winding for said amplistat, adjustable means for energizing said control winding with predetermined polarity, a biasing winding for said amplistat, means for energizing said biasing winding from said supply circuit so that the biasing effect thereof is dependent upon a predetermined electrical quantity of said supply circuit, and a feedback winding on said amplistat energized in accordance with the voltage of said load circuit.

4. In combination, an alternating current supply circuit, a direct current load circuit, electric valve means having an anode, a cathode, and a control member interposed between said circuits, a control circuit for energizing said control member so as to render said valve means conductive periodically, phase shifting means including a direct current control winding for varying the phase angle of the energization of said control member relative to the voltage of said anode and cathode, amplistat means having main windings energized from a source of alternating current voltage and arranged in series with unidirectional conducting devices to supply direct current to said direct current control winding of said phase shifting means, a control winding for said amplistat, adjustable means for energizing said control winding with predetermined polarity, a biasing winding for said amplistat, means for energizing said biasing winding from said supply circuit so that the biasing effect thereof is dependent upon the voltage of said supply circuit, and a feedback winding on said amplistat energized in accordance with the voltage of said load circuit.

5. In combination, an alternating current supply circuit, a direct current load circuit, electric valve means having an anode, a cathode, and a control member interposed between said circuits, a control circuit for energizing said control member as to render said valve means conductive periodically, phase shifting means including a direct current control winding for varying the phase angle of the energization of said control member relative to the voltage of said anode and cathode, amplistat means having main windings energized from a source of alternating current voltage and arranged in series with unidirectional conducting devices to supply direct current to said direct current control winding of said phase shifting means, a control winding for said amplistat, adjustable means for energizing said control winding with predetermined polarity, a biasing winding for said amplistat, means for energizing said biasing winding from said supply circuit so that the biasing effect thereof is dependent upon the frequency of said supply circuit, and a feedback winding on said amplistat energized in accordance with the voltage of said load circuit.

6. In combination, an alternating current supply circuit, a direct current load circuit, electric valve means having an anode, a cathode and a control member interposed between said circuits, a control circuit for energizing said control member so as to render said valve means conductive periodically, phase shifting means including a direct current control winding for varying the angle between the time of energization of said control circuit relative to the voltage of said anode and cathode, amplistat means having main windings energized from said alternating current supply circuit and arranged in series with unidirectional conducting devices to supply direct current to said direct current control winding of said phase shifting means, a control winding for said amplistat, adjustable means for energizing said control winding with predetermined polarity, a biasing winding for said amplistat, means for energizing said biasing winding from said supply circuit so that the biasing effect thereof is dependent upon the voltage of said supply circuit, and a feedback winding on said amplistat energized in accordance with the voltage of said load circuit, the magnetizing action of said control winding being effective to aid the magnetizing action of the circuit through said main windings.

7. In combination, an alternating current supply circuit, a direct current load circuit, electric valve means having an anode, a mercury pool cathode and an ignitor interposed between said circuits, a control circuit for energizing said ignitor, phase shifting means including a direct current control winding for controlling the energization of said control circuit relative to the voltage of said anode and cathode, amplistat means having main windings energized from a source of alternating current voltage and connected in series with rectifying means to supply direct current to said direct current control winding of said phase shifting means, a control winding for said amplistat, adjustable means for energizing said control winding with a predetermined value of control current, a biasing winding for said amplistat, means for energizing said biasing winding from said supply circuit so that the biasing effect thereof is dependent upon the voltage of said supply circuit, and a feedback winding on said amplistat energized in accordance with the voltage of said load circuit.

8. In combination, an alternating current supply circuit, a direct current load circuit, electric valve means having an anode, a cathode and a control member interposed between said circuits, a control circuit for periodically energizing said control member, phase shifting means including a direct current control winding for varying the periodic energization of said control circuit relative to the voltage of said anode and cathode, amplistat means having main windings energized from a source of alternating current voltage and arranged in series with unidirectional conducting devices to supply direct current to said direct current control winding of said phase shifting means, a control winding for said amplistat, adjustable means for energizing said control winding with a predetermined value of direct current, a biasing winding for said amplistat, transformer and rectifying means for energizing said biasing winding with direct current from said supply circuit so that the biasing effect thereof is dependent upon the voltage of said supply circuit, and a feedback winding on said amplistat energized in accordance with the voltage of said load circuit.

9. In combination, an alternating current supply circuit, a direct current load circuit, electric valve means having an anode, a cathode and a control member interposed between said circuits, a control circuit for energizing said control member, phase shifting means including a direct current control winding for varying the energization of said control circuit relative to the voltage of said anode and cathode, amplistat means having main windings connected in series with rectifying means and energized from a source of alternating current voltage for supplying direct current to said direct current control winding of said phase shifting means, said main windings being connected to conduct alternate half cycles of current from said source, a control winding for said amplistat, adjustable means for energizing said control winding with a predetermined value of control current, a biasing winding for said amplistat, means for energizing said biasing winding from said supply circuit so that the biasing effect thereof is dependent upon the voltage of said supply circuit, means for adjusting the biasing action of said biasing winding, and a feedback winding on said amplistat energized in accordance with the voltage of said load circuit, the magnetizing action of said feedback and biasing windings being in opposition to the magnetizing action of said control winding and said main windings.

ALBERT H. MITTAG.
MARVIN J. MULHERN.

REFERENCES CITED

The following references are of record in the file of this patent:

UNITED STATES PATENTS

| Number | Name | Date |
|---|---|---|
| 2,103,997 | Bedford | Dec. 28, 1937 |
| 2,126,790 | Logan | Aug. 16, 1938 |
| 2,128,771 | Forssell et al. | Aug. 30, 1938 |
| 2,186,244 | Hartel | Jan. 9, 1940 |
| 2,193,649 | Schmidt | Mar. 12, 1940 |
| 2,349,633 | Meyers | May 23, 1944 |
| 2,435,187 | Bedford | Feb. 3, 1948 |